United States Patent [19]

Harper-Tervet et al.

[11] 4,359,503

[45] Nov. 16, 1982

[54] MIXED POLYVALENT-MONOVALENT METAL COATING FOR CARBON-GRAPHITE FIBERS

[75] Inventors: Jan Harper-Tervet; Fred W. Tervet, both of Palmdale; Marshall F. Humphrey, Duarte, all of Calif.

[73] Assignee: The United States of America as represented by the Administrator of the National Aeronautics and Space Administration, Washington, D.C.

[21] Appl. No.: 164,584

[22] Filed: Jun. 30, 1980

[51] Int. Cl.³ .............................................. B32B 19/02
[52] U.S. Cl. .................................... 428/367; 427/215; 427/241; 428/375; 428/392; 428/902; 428/903
[58] Field of Search ............. 428/367, 902, 903, 375, 428/392, 368; 252/506, 508, 509, 511, 500; 427/180, 197, 113, 114, 216, 212, 215, 301, 341, 343, 407.1, 419.8; 260/29.1 R, 29.4 R, 29.2 R, 29.2 EP, 338 EP, 37 N, 37 SB, 40 R

[56] References Cited

U.S. PATENT DOCUMENTS

| | | | |
|---|---|---|---|
| 4,064,074 | 12/1977 | Ellis | 252/511 X |
| 4,119,572 | 10/1978 | Fridman et al. | 427/114 X |
| 4,177,318 | 12/1979 | Williams | 428/408 |
| 4,214,037 | 7/1980 | Glasso et al. | 428/367 |

Primary Examiner—Norman Morgenstern
Assistant Examiner—Thurman K. Page
Attorney, Agent, or Firm—Paul F. McCaul; John R. Manning; Thomas H. Jones

[57] ABSTRACT

An improved coating of gasification catalyst for carbon-graphite fibers is provided comprising a mixture of a polyvalent metal such as calcium and a monovalent metal such as lithium. The addition of lithium provides a lighter coating and a more flexible coating when applied to a coating of a carboxyl containing resin such as polyacrylic acid since it reduces the cross-link density. Furthermore, the presence of lithium provides a glass-like substance during combustion which holds the fiber together resulting in slow, even combustion with much reduced evolution of conductive fragments. The coated fibers are utilized as fiber reinforcement for composites.

11 Claims, No Drawings

MIXED POLYVALENT-MONOVALENT METAL COATING FOR CARBON-GRAPHITE FIBERS

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

TECHNICAL FIELD

The present invention relates to coated carbon-graphite fibers and, more particularly, to such fibers containing a catalytic carbon capable of combustion of such fibers in a burning composite.

BACKGROUND ART

Considerable interest exists in the future use of carbon-graphite fibers due to their light weight and high strength. Presently, about 30 pounds of graphite are being utilized per plane in manufacture of several existing aircraft and future projected use is 1000 lbs/aircraft. Due to the need to reduce weight of automobiles to increase fuel efficiency, use in cars is also expected to increase dramatically over the next decade. The projected annual use of graphite fibers by 1990 is as follows:

TABLE 1

| Industry | Pounds |
| --- | --- |
| Aerospace | $10^6$ |
| Automobile | $10^9$ |
| Consumer | $10^6$ |

Commercial carbon fiber is usually sold as a stranded material or as a woven cloth, having from 100 to 10,000 discrete thin fibers per strand. These fibers are prepared by heating a precursor such as rayon, pitch or polyacrylonitrile fiber to carbonize the fibers followed by a high temperature (2000°–3000° C.) graphitization treatment under stress in absence of oxygen during which it is believed that the carbon atoms rearrange into a hexagonal structure. The industry has developed fine strand multifilament products as the result of difficulties in manufacturing large diameter fiber of sufficiently high modulus. It will be noted that an extremely small fiber diameter is now the industry standard, and is not predicted to change very much in the immediate future:

Carbon Fiber Diameter—6.5 to 13 microns
Modulus—50 million psi
Fall Rate in air at 1 ATM—about 2 cm/sec.
Resistivity—1000 ohms/cm.
Burnout—0.5 to 1.0 watt/cm.
Contact Voltage Drop—2 to 5 volts Recently a significant hazard has been recognized that could prevent the widespread use of graphite fibers. The fine fibers are conductive and are not oxidized nor vaporized at the temperatures experienced during a typical fire. During a fire the epoxy or other resin binder is destroyed at 400°–600° C. Fine graphite fibers and fragments are expelled from the composite, are entrained in the air and form aerosols. The aerosols can travel significant distances, invade or settle in unprotected electrical or electronic equipment and cause shorting, equipment failure, power failure and blackouts. Automobile fires are quite a common event and aircraft fires occur frequently. Such an event could cause disastrous consequences at or near airport, industrial or residential areas.

Since the surface temperature of combustion (fast oxidation) of graphite is in the vicinity of 1300° C., fast oxidation of graphite is hardly reached by the simple combustion of a composite panel which occurs at typical surface temperature of 400–500 degrees C. Also, even if the requisite temperatures are reached, the rates of combustion (oxidation) are too low compared to the same rates for the resin. This has the practical implication that the resin burns away fast leaving behind the graphite fibers that do not combust in the absence of the supporting flame. The fiber diameter of 8 microns presents a 2500 $cm^2$ surface area per gram of mass. This is very large and leads to rapid heat loss and is conducive to early extinction even if the combustion is initiated.

An additional property of the carbon fiber is the "red heat" behavior. It should be emphasized that in a shorting situation a single carbon fiber is most difficult to burn or consume. Rather the literature suggests that the carbon fiber becomes a glowing filament and does not pyrolyze or burn at least to about 2300° K. And even above that temperature adequate air circulation is required to consume the fiber fully. A minimum of 16 grams of oxygen are needed to consume 12 grams of carbon, and hence in a closed area such as in the chassis of an electronic system, lack of air circulation and sufficiently high voltages may cause the fibers to develop a "red heat" condition and ignite adjacent flammable plastics and the like.

In order to permit such widespread use of graphite composites, the recognized electrical hazards must be overcome economically without sacrificing or compromising the proven good features (strength, weight and cost). This aim should preferably be achieved so that the fiber and composite are compatible with state of the art processing and equipment. Furthermore, modification of the fiber by coating or treatment must provide a good bond to the fiber and to the resin matrix.

One approach to solving this problem is disclosed in a prior patent application entitled GASIFIABLE CARBON-GRAPHITE FIBERS filed on Apr. 17, 1979 by Marshall F. Humphrey, Kumar N. R. Ramohalli and Warren L. Dowler under Serial No. 030,836, the disclosure of which is expressly incorporated herein by reference.

This copending application discloses the coating of carbon-graphite fibers with a salt of a metal having a work function below 4.2 eV such as an alkaline earth metal salt. The coating catalytically enhances combustion of the fibers at temperatures below 1000° C. such that the fibers self-support combustion and burn to produce a non-conductive ash even in the absence of an external flame. It is important that the coating of the metal salt be applied uniformly and economically to the graphite.

Ion plating and electrodeposition will provide a uniform coating of metal salt, but are costly and time consuming. Application of the coating by immersion in a solution of a salt followed by drying results in a non-uniform, clumpy coating, which was difficult to control, was not esthetically pleasing and caused non-uniform burning of the fibers which results in explosion of fiber fragments when a composite is burned.

Commonly assigned application Ser. No. 164,585 filed concurrently herewith, discloses a method of easily and economically applying a thin, uniform, firmly adhering coating formed of a cross-linkable, film forming polymer having good wettability, for the carbon-graphite fiber and containing functional moieties along or pendant from the polymer backbone capable of reaction with multivalent catalytic cations. After application of a thin even layer of the polymer to the fibers, the catalyst metal is applied to the layer and reacts therewith to insolubilize the layer by forming catalytic metal macrosalt cross-links between adjacent molecular polymer chains. A thin, even coating of catalyst results which is uniform in appearance, forms high strength composites and burns evenly in a fire situation. However, it has been determined that multivalent cations such as calcium, cause excessive cross-linking making the fiber bundle too rigid and affecting handling and physical properties and there is still a tendency for fragments of the fiber to break off during combustion.

DISCLOSURE OF INVENTION

An improved coating of combustion catalyst for graphite fibers is provided in accordance with this invention. The coating adds less weight penalty and provides a more flexible fiber having better physical properties and compatibility with the binder resin. The coating holds the fiber tow together during burning resulting in slow even combustion with much reduced evolution of conductive fragments.

It was discovered that the calcium ion caused excessive cross-linking of the film forming polymer. An improved catalyst coating is provided by utilizing a mixture of monovalent alkali metal salt in combination with the polyvalent metal salt. The monovalent ion such as lithium occupies many of the potential cross-linking sites and therefore improves flexibility. Furthermore, the lithium salt forms a glassy substance during combustion holding the fiber tow together. The coated fiber is lighter since lithium is much lighter than calcium. The metal salt catalyst mixture may be directly applied to the fibers but is preferably coated onto a fiber coated with the cross-linkable film.

The mechanical properties of the fibers and of the composite are not affected by the presence of the coating. The coating is present in an amount of 0.1 to 10% by weight which does not entail a significant weight penalty. The coating is compatible with binder resins and its presence does not require modification of state-of-the-art fiber and composite processing techniques nor fabrication equipment. This will facilitate quick transfer of the technology to industrial practice.

These and many other features and attendant advantages of the invention will become readily apparent as the invention becomes better understood by reference to the following detailed description.

DETAILED DESCRIPTION OF THE INVENTION

The fibers are carbon-graphite monofilaments containing from at least 10% graphite up to 100% graphite. The graphite forms a conductive coating on the exterior surface of the fibers. The graphite fibers have a diameter of at least 1 micron. Fibers having diameter above 30 microns are too heavy to entrain in air and, therefore, do not form aerosols. The fibers are usually provided as a multifilament yarn containing 0.10 to 100,000, preferably 100 to 3000 filaments per strand and can be woven into cloth.

The catalysts in accordance with this invention are salts of a polyvalent and monovalent electronegative metal, each having a work function less than 4.2 eV. The metals can be selected form Groups I to VIII of the Periodic Table. However, the most cost effective polyvalent catalysts are the alkaline earth metals, particularly barium, calcium, strontium and magnesium. The monovalent metal is preferably lithium. The anions can be inorganic, organic or polymeric anions. Typical anions are carbonate, nitrate, hydroxyl, sulfate or salts of organic acids containing from 2 to 20 carbon atoms such as acetates, gluconates, acrylates, tartrates, acetoacetonates or mixtures thereof or poly anions containing carboxylate groups or triazine or phthalocyanine resins. As little as 5% by weight monovalent metal provides improved flexibility and burning characteristics. At least 5% of the catalytic salt mixture should be polyvalent metal to provide cross-linking. The preferred amount of monovalent metal is from 60% to 90% of the catalytic metal mixture.

The catalytic metal is present in an amount from at least 0.05% to provide significant catalytic combustion enhancement and cross-linking. Amounts have 20% by weight add too much weight penalty to the fiber. Generally, effective gasification can be achieved with from 0.1 to 10% by weight of the catalyst. It has further been discovered that the rate of gasification is further enhanced by adding from 0.1 to 20% by weight of the catalyst to the binder resin of the composite.

The film forming resin is present on the fibers in an amount from 1 to 10% by weight. The film forming resin is an organic uncross-linked polymer containing an anion function capable of forming a salt with the catalytic cation. Suitable functional groups are carboxyl, sulfonic or phosphonic. The polymer backbone may be aliphatic or aromatic. The cross-linked film forming polymer should be insoluble in and physically compatible with the matrix binder resin and may additionally contain functional groups reactive with the matrix resin. A preferred polymer that readily wets the carbon-graphite fibers and contains carboxyl functionality are polymers of acrylic acid. Liquid polymers having a molecular weight from 5,000 to 100,000 are suitable, preferably from 10,000 to 50,000. The polymer may be a homopolymer or a copolymer with 10 to 70% by weight other addition copolymerizable olefinic monomers such as acrylic esters for example methyl acrylate, methyl methacrylate or ethyl acrylate. The polymer may contain functional groups other than carboxyl capable of reaction with epoxy groups or other functional groups of the matrix resin such as amine groups.

The polymer layer can be applied to the fiber from bulk, solution, or dispersion. For reasons of economics and ease and uniformity of application, the polymer is preferably applied to the fiber from aqueous solution followed by evaporation of water to deposit a thin even layer of polymer on the fiber. The solution can be a dilute solution containing 5 to 30% by weight of polymer solids. The solution can be applied by immersion, spraying or brushing the solution onto the fiber whether in monofilament, multifilament, strand or woven cloth form. The solution should penetrate, wet, and coat each individual monofilament. The polymer film need not be applied directly to the surface of the fiber but may be applied to the typical sizing coating such as polyvinyl alcohol or epoxy resin.

The catalytic metal is preferably applied to the polymer coated fibers at elevated temperature, suitably by immersion in a boiling solution of a mixture of catalytic metal salt in order to increase the rate and extent of cross-linking and binding of catalytic metal to the fibers. The cross-link density to render the polymer insoluble need not be that high. Two or more cross-links per polymer chain is probably sufficient. The remainder of the catalytic metal can be present on the fiber as a mixed salt of the polymer anion and the catalytic salt anion such as acetate. The boiling procedure provides cross-linking of some of the available polymeric anion groups and binding of monovalent metal cation to other of the polymeric anionic groups.

The composites usually contain from 30% up to 70% of graphite fiber reinforcement, typically from 40% to 60% graphite fibers dispersed in the matrix resin. Various resins can be utilized such as epoxy resins, polyesters, phenolics, silicones or polimides. The most widely used and qualified resins are bisphenol A epoxy resins cured with from 10 to 30% of diamine curing agent hardeners.

During the investigation to find materials that would catalyze the gasification of carbon fibers, it was discovered that calcium salts and lithium salts were very reactive. These materials were examined singly at various concentrations in aqueous solutions and as mixtures. Screening examinations were made with the following compounds: Calcium chloride, Calcium hydroxide, Calcium oxide, Calcium acetate, Calcium nitrate, Calcium stearate, Calcium chromate, Lithium nitrate, Lithium acetate, Lithium carbonate, Lithium hydroxide, Lithium chloride, Lithium gluconate and Lithium sulphate. Solutions of each material was made up at various concentrations from 0.5 to 10% (by weight). These solutions were examined singly and in various combinations for effect on the fiber gasification. Fibers were dipped in these solutions and air dried. The treated fibers were examined by the following methods: (1) atmospheric air combustive oxidation, (2) differential scanning calorimeter (DSC), and (3) thermogravimetric analysis (TGA). Combustion products were also examined in an effort to determine the mechanism for the fiber destruction.

Testing Procedures

1. Water stock solutions were made up of the calcium and lithium acetates at concentrations of 10% by weight. Stock solutions were diluted to other concentrations as required.

2. Carbon fibers (T-300 or AS-4) were prepared for coating in various ways to try to form a uniform coat such as:
   (a) Fire polished by pulling through a flame to remove coatings or oxidize the surface. The T-300 fiber was coated with a sizing material by the manufacturer.
   (b) Soaked in concentrated nitric acid for 5 minutes then washed in water until neutral to litmus paper.
   (c) Soaked in 5 percent sodium hydroxide solution. Washed in water until neutral to litmus paper.
   (d) Plasma soaked (10 minutes in argon plasma).

3. The 10 percent stock solutions were diluted with water to solutions of 0.05%, 1% and 5%. One part of the calcium solution was mixed with 1 part of the lithium solution to form a combination set of test solutions (9 solutions).

4. Carbon fibers were cut to approximately 4-inch lengths and a single piece was placed in each solution and allowed to sit overnight.

5. Fibers were removed from the solutions and air dried after wringing off the excess solutions.

6. TGA, DSC and combustion tests were performed on the dried fibers to determine the effects.

During the experimentation with mixtures of calcium and lithium acetates, a synergistic effect was noted in the destruction of the graphite fiber. The lithium compounds when applied to the graphite fibers (solution concentrations from 0.1 to 10%) produced, upon heating, a glassy coating. This coating appeared to consume the graphite fiber by solubilizing it when subjected to a flame. No after glow was noted. Calcium acetate on the other hand when applied alone to the fibers, at solution concentrations from 0.05 to 10%, caused the fibers to continue glowing (self-sustained oxidation) when removed from the flame. TGA and DSC examination data of single compound treated fibers showed degradation temperatures and weight loss values at 400° to 450° C. (untreated fibers showed no degradation up to 1000° C. in an inert atmosphere).

Mixed solutions of calcium and lithium acetate at various concentrations (1% by weight solutions at ratios of 1/1 found to be effective) produced the following unexpected results: Decomposition as indicated by TGA and DSC, occurred at lower temperatures than the neat fiber, the melted lithium salt appeared to "wet" the fiber surface evenly, Scanning Electron Microscope examination showed a uniform coating with no irregular build up of calcium crystals, material worked (gasified the fiber) in a more uniform manner and left a completely non-conductive ash. Most important was the ability of the lithium salts to prevent the spalling of combusting fibers pieces during gasification. Lithium also operates as a modifier to prevent excessive cross-linking of the acetate coating as illustrated in the following examples.

Examples of practice follow:

EXAMPLE 1

A sample of 2.99318 g of woven carbon-graphite fiber was soaked in 20% aqueous poly-acrylic acid solution, blotted and then dried for 3½ hours at 45 degrees C. The amount of poly-acrylic acid on the fiber after drying was determined to be 0.07641 g. The poly-acrylic acid coated fiber was reacted with boiling calcium acetate (20% solution in water), blotted and then dried for 20 minutes at 115 degrees C. The weight of calcium acetate remaining on the fiber after washing and redrying was 0.03771 g. A sample strand burned in a flame gasified almost completely with a few fragments flying off.

EXAMPLE 2

A sample of 1.94556 g of woven carbon-graphite fiber was coated with 0.46751 g of poly-acrylic acid, and then reacted with a 10% aqueous solution containing 25% of lithium acetate and 25% of calcium acetate, blotted, dried and determined that 0.08661 grams of lithium-calcium acetates have been added to the fiber. The fiber appeared to be lighter and less rigid than those treated with a pure calcium acetate solution. The fibers appeared to be held together better by the lithium-calcium mixture. A sample of the fiber burned evenly and appeared to gasify fairly completely. The lithium appears to hold the filaments in place until the calcium can gasify the fiber.

EXAMPLE 3

A sample of 2.43534 g of woven carbon-graphite fiber was coated with 0.04613 g of poly-acrylic acid and then treated with an aqueous 5% boiling solution of an equal weight mixture of lithium and calcium acetates to deposit 0.0745 grams of the mixture on the fibers.

EXAMPLE 4

The procedure of Example 3 was repeated with a 2.07777 g sample of carbon-graphite fiber containing 0.04285 g of poly-acrylic acid. The coated fiber was dipped into a boiling 50% solution of an equal mixture of lithium and calcium acetates to deposit 0.02987 g weight of the mixed acetates on the fiber.

EXAMPLE 5

A sample of 2.64039 g of carbon-graphite fiber containing 0.05882 g of poly-acrylic acid was treated with a 50/50 mixture of boiling lithium/calcium acetate mixture in a 10% solution to deposit 0.11550 g of the mixed acetates on the fiber. Each of the burned samples of Examples 3, 4 and 5 were more flexible than that of Example 2 and burned evenly and substantially completely in a flame.

EXAMPLE 6

A sample of carbon-graphite fiber containing about 2% by weight of poly-acrylic acid was treated with a 10% boiling solution of a mixture of lithium calcium acetates in a ratio of 75/25 lithium/calcium. A sample of the fiber was very flexible, evenly coated and held together very well and burned completely in a flame.

The catalytic coated fibers of this invention demonstrate self-sustained fiber gasification to a nonconductive ash. The new catalytic coating involves a small cost and only increases the weight penalty slightly over the prior metal salt coatings. The new coating provides significant improvement in the alleviation of short circuits in burned graphite composites due to its formation of a thin even coating and provides more flexible fibers.

It is to be realized that only a preferred embodiment of the invention has been described and that numerous substitutions, modification and alterations are permissible without departure from the spirit and scope of the invention as defined in the following claims.

What is claimed is:

1. A composition of matter comprising:
    30% to 70% by weight of graphite fibers coated with 0.1 to 10% by weight of the fibers of a gasification catalyst comprising a mixture of a monovalent alkali metal salt and polyvalent alkaline earth metal salt having a work function below 4.2 eV; said monovalent metal salt comprising 5 to 95% by weight of said mixture; and
    the remainder consisting essentially of binder resin and said coated fibers being embedded and dispersed in said binder resin.

2. A composition according to claim 1 in which the fibers are coated with an organic polymer containing anion groups some of which are cross-linked by said polyvalent metal and others contain said monovalent metal.

3. A composition according to claim 1 in which the fibers are in the form of a multifilament yarn.

4. A composition according to claim 1 in which the binder resin is selected from epoxy, polyester, phenolic, silicone or polyimide resins.

5. A composition according to claim 4 in which the resin is an epoxy.

6. A composition according to claim 4 in which the polyvalent metal is selected from calcium, barium and strontium.

7. A composition according to claim 6 in which the monovalent metal is lithium.

8. A composition according to claim 1 in which the mixture contains from 60 to 90% by weight of monovalent metal.

9. A method of forming a composite containing gasifiable graphite fiber comprising the steps of:
    applying a solution containing a mixture of salts of a monovalent alkali metal salt and a polyvalent alkaline earth metal salt, both said metals having a work function below 4.2 eV to the exterior surface of a fine graphite fiber having a diameter from 1 to 30 microns to form gasification catalyst on the fiber in an amount from 0.05 to 20% by weight of the fiber and consisting of 5 to 95% by weight of said monovalent metal;
    dispersing 30 to 70% by weight of the coated fibers in a binder resin; and
    curing the resin to form a composite.

10. A method according to claim 9 in which the coating contains from 60 to 90% by weight of monovalent metal.

11. A method according to claim 9 in which the monovalent metal is lithium and the polyvalent metal is calcium.

* * * * *